United States Patent [19]

Noll et al.

[11] Patent Number: 4,839,850

[45] Date of Patent: Jun. 13, 1989

[54] APPARATUS FOR BIT-PARALLEL ADDITION OF BINARY NUMBERS

[75] Inventors: Tobias Noll, Neckartailfingen; Walter Ulbrich, Puchheim, both of Fed. Rep. of Germany

[73] Assignee: Siemens Aktiengesellschaft, Berlin and Munich, Fed. Rep. of Germany

[21] Appl. No.: 883,942

[22] Filed: Jul. 10, 1986

[30] Foreign Application Priority Data

Jul. 11, 1985 [DE] Fed. Rep. of Germany ....... 3524797

[51] Int. Cl.$^4$ ............................................. G06F 7/50
[52] U.S. Cl. ................................ 364/787; 364/724.17
[58] Field of Search ............... 364/787, 784, 786, 788, 364/724

[56] References Cited

U.S. PATENT DOCUMENTS

| | | | |
|---|---|---|---|
| 3,675,001 | 7/1972 | Singh .................................... | 364/786 |
| 3,700,875 | 10/1972 | Saenger et al. ...................... | 364/787 |
| 4,651,296 | 3/1987 | Koike .................................... | 364/784 |
| 4,660,165 | 4/1987 | Masumoto ........................... | 364/787 |

OTHER PUBLICATIONS

Freeman, "Checked Carry Select Adder", IBM Tech. Discl. Bull., vol. 13, No. 6, Nov. 1970, pp. 1504–1505.
Chaudhry et al, "Parallel Binary Adder", IBM Tech. Discl. Bull., vol. 14, No. 5, Oct. 1971, p. 1477.
Williams, "Adder Architecture", IBM Tech. Discl. Bull., vol. 23, No. 10, Mar. 1981, pp. 4587–4590.
K. Hwang, "Computer Arithmetic", (1979), pp. 98–103, John Wiley and Son, New York.
Proceedings of IEEE, vol. 63, No. 4, Apr. 1975, pp. 633–648, Title "Special-Purpose Hardware for Digital Filtering" by Freeny.

Primary Examiner—Gary V. Harkcom
Assistant Examiner—Tan V. Mai
Attorney, Agent, or Firm—Hill, Van Santen, Steadman & Simpson

[57] ABSTRACT

In an arrangement for the bit-parallel addition of binary numbers in two's complement form, a series of adders ($AD_i$) are provided to receive inputs for binary bits of equivalent significance and to emit intermediate sum and carry words which are combined to form result sum words. For the correction of overflow errors, the carry bit of the adder ($AD_{n-2}$) having the second highest significance is replaced by the carry bit of the most significant adder ($AD_{n-1}$) and, when the carry bits of the two most significant adders ($AD_{n-1}$, $AD_{n-2}$) are unequal, the intermediate sum bit of the most significant adder ($AD_{n-1}$) is replaced by its carry bit.

9 Claims, 6 Drawing Sheets

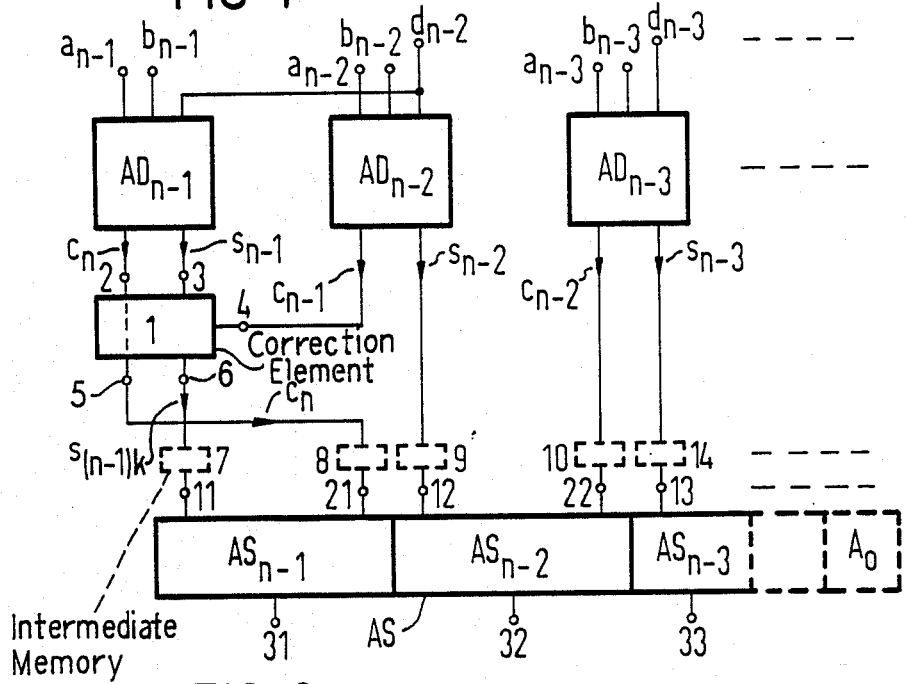
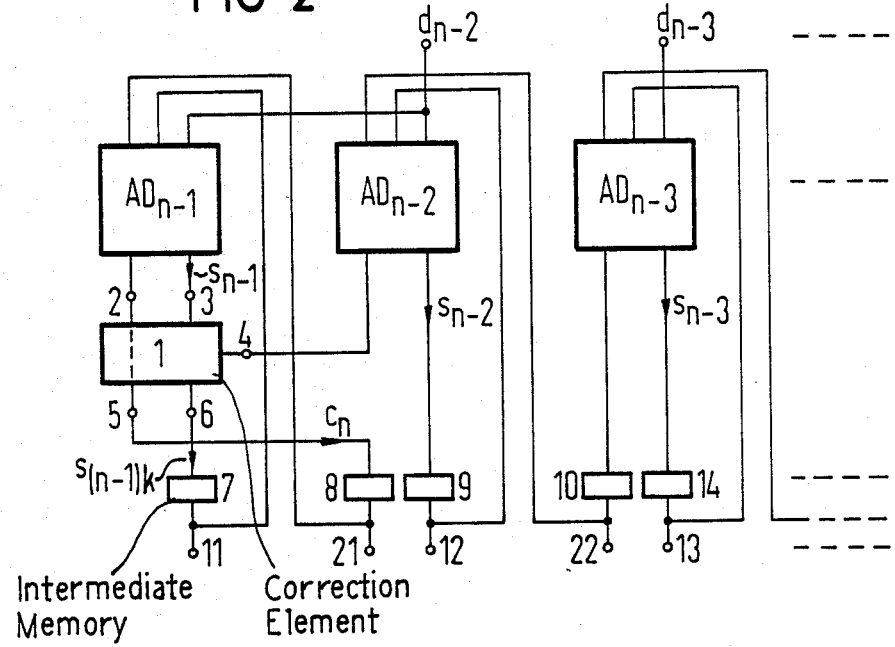

FIG 5

| $a_{n-1}$ | $b_{n-1}$ | $d_{n-1}$ | $\overline{c}_{n-1}$ | $\overline{c}_n$ | $\overline{s}_{(n-1)k}$ |
|---|---|---|---|---|---|
| 0 | 0 | 0 | 0 | 1 | 1 |
| 0 | 0 | 0 | 1 | 1 | 1 |
| 0 | 0 | 1 | 0 | 1 | 1 |
| 0 | 0 | 1 | 1 | 1 | 0 |
| 0 | 1 | 0 | 0 | 1 | 1 |
| 0 | 1 | 0 | 1 | 1 | 0 |
| 0 | 1 | 1 | 0 | 0 | 1 |
| 0 | 0 | 1 | 1 | 0 | 0 |
| 1 | 0 | 0 | 0 | 1 | 1 |
| 1 | 0 | 0 | 1 | 1 | 0 |
| 1 | 0 | 1 | 0 | 0 | 1 |
| 1 | 0 | 1 | 1 | 0 | 0 |
| 1 | 1 | 0 | 0 | 0 | 1 |
| 1 | 1 | 0 | 1 | 0 | 0 |
| 1 | 1 | 1 | 0 | 0 | 0 |
| 1 | 1 | 1 | 1 | 0 | 0 |

APPARATUS FOR BIT-PARALLEL ADDITION OF BINARY NUMBERS

BACKGROUND

This invention relates to an arrangement for bit-parallel addition of binary numbers in two's complement form.

An arrangement of this general type is known from the book *Computer Arithmetic* by K. Hwang, John Wiley and Sons, New York 1979, pp. 98–103, particularly FIG. 4.2. Every first adder comprises three inputs that are respectively occupied with equivalent bits of three binary numbers to be added to one another. The sum output terminals of the first adders are connected to first input terminals of a further adder means, and the carry output terminals of the first adders (with the exception of the most significant adder) are connected to second input terminals of the adder means. A sum word appears at the outputs of the latter as the result of the addition. In contrast to an adder arrangement having a ripple carry ("carry-propagate" principle), the carries of all of the first adders are simultaneously formed (in the case of addition of three binary numbers) and are available with the intermediate sum word produced by the first adders. An adder arrangement constructed in this way operates according to what is referred to as the "carry-save" principle.

In a "carry-save" arrangement for the addition of binary numbers in two's complement, an overflow effect that leads to an incorrect result can occur because of the separate representation of the sum supplied by the first adders in the form of an intermediate sum word and of a carry word. Such an error arises when relatively small sum words are formed from larger intermediate sum words, and carry words are formed having opposite operational signs.

BRIEF DESCRIPTION OF THE INVENTION

The object of the invention is to provide an arrangement wherein the overflow effect does not occur. The advantage obtainable with the invention is particularly that intermediate sum words and carry words which would produce such an overflow effect and, thus, an addition error, are brought into a form which reliably avoids the appearance of faulty addition results, by means of simple correction measures with the two most significant first adders.

BRIEF DESCRIPTION OF THE DRAWINGS

The invention shall be set forth in greater detail below with reference to preferred exemplary embodiments shown in the drawings, in which:

FIG. 1 is a functional block diagram of an arrangement of the invention for bit-parallel addition of three binary numbers;

FIG. 2 is a functional block diagram of an arrangement of the invention for bit-parallel addition of three binary numbers in a recursive circuit design;

FIG. 5 is a function table for another sub-circuit from FIGS. 1 through 3;

DESCRIPTION OF THE PREFERRED EMBODIMENTS

Figure 3:
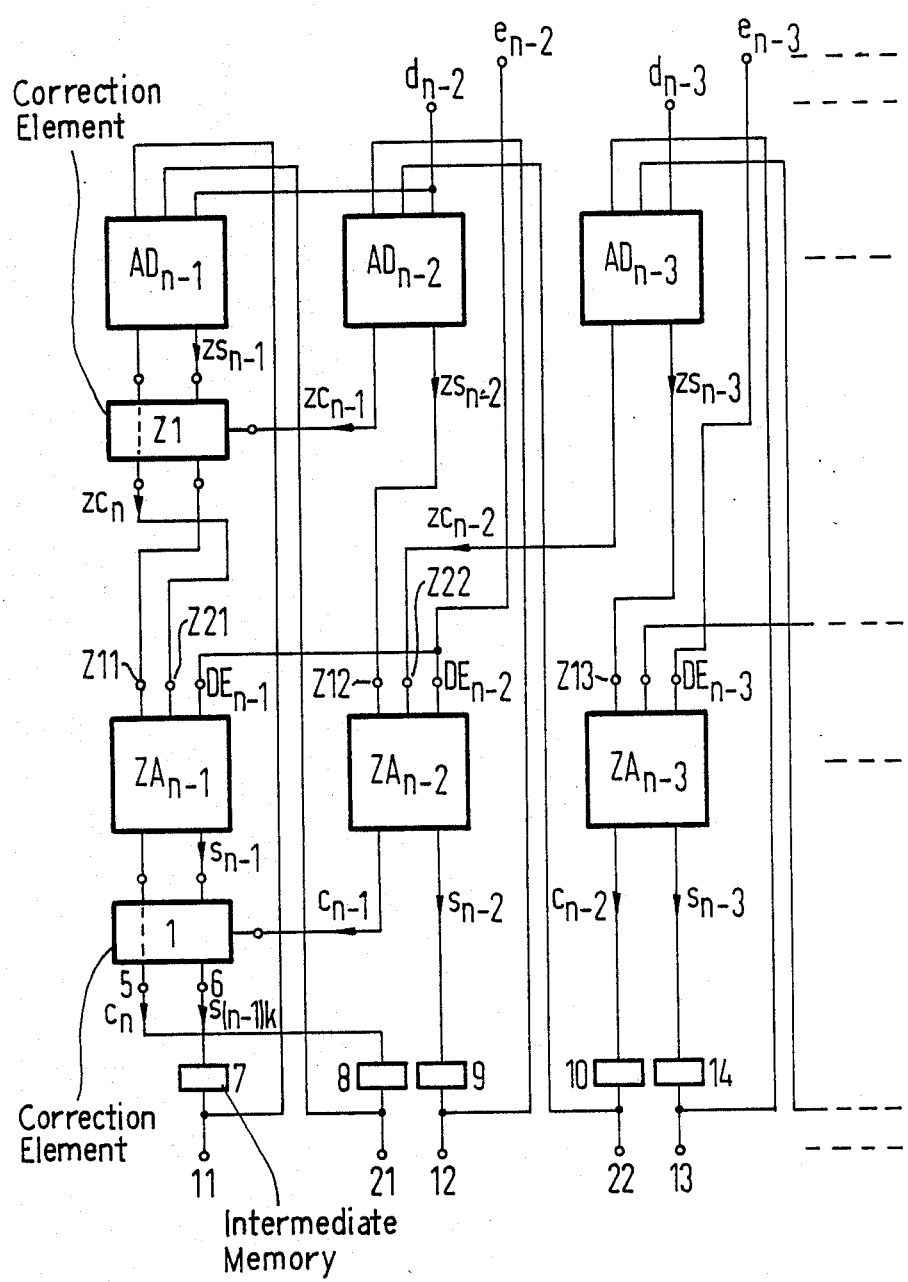
FIG. 3 is a functional block diagram of an arrangement of the invention for bit-parallel addition of four binary numbers in a recursive circuit design.

Three adders $AD_{n-1}$, $AD_{n-2}$ and $AD_{n-3}$ which respectively comprise three inputs are shown in FIG. 1. The first input of $AD_{n-1}$ receives the most significant bit $a_{n-1}$ of an n-place binary number A represented in two's complement; the first input of $AD_{n-2}$ receives $a_{n-2}$ and the first input of $AD_{n-3}$ receives $a_{n-3}$. The first inputs of further adders (not shown) receive the further bits $a_{n-4}$ through $a_O$. In an analogous way, second inputs of the individual adders $AD_i$ receive the individual bits $b_{n-1}$, $b_{n-2}$ ... of a binary number B represented in two's complement, whereas third inputs of these adders are respectively wired with the individual bits $d_{n-2}$, $d_{n-3}$ ... of a third binary number D. The number D is an $(n-1)$-place binary number which is expanded to an n-place number by a doubling of its operational sign bit, whereby the operational sign bits are respectively supplied to the third inputs of $AD_{n-1}$ and $AD_{n-2}$.

The result arising by the addition of A, B and D is specified by two separate signals in accord with the "carry-save" principle, namely by an intermediate sum word $s_{n-1}$, $s_{n-2}$, $s_{n-3}$, ... $s_O$, which can be taken in bit fashion as the sum outputs of the adders $A_i$ and by a carry word $c_n$, $c_{n-1}$, $c_{n-2}$ ... $c_1$ which can be taken in bit fashion at the carry outputs of $AD_i$. In an adder means AS comprising individual adders $AS_{n-1}$, $AS_{n-2}$, ... $AS_O$, both words are then combined to form the sum word which represents the result of $A+B+D$. For this purpose, the traditional technique has been to connect the first inputs 11, 12, 13 etc., of AD with the individual bits $s_{n-1}$, $s_{n-2}$, $s_{n-3}$, etc., of the intermediate sum word and to connect the second inputs 21, 22, etc., with the bits $c_{n-1}$, $c_{n-2}$, etc., of the carry word. The most significant bit $c_n$ of the carry word is thereby initially neglected. The sum word is then available at the outputs 31, 32, 33, etc.

Such a hitherto traditional or standard input connection of AS could be illustrated in FIG. 1 by direct connections (not shown therein) of the output of $AD_{n-1}$ which emits the bit $s_{n-1}$ to the input 11 and of the carry output of $AD_{n-2}$ which emits $c_{n-1}$ to the input 21 and by the indicated occupations of 12, 13 and 22.

When only two-place binary numbers are considered in a first numerical example having n=2 and it is assumed that $A=-2$, $B=0$ and $D=-1$, this denoting $A=10$, $B=00$ and $D=11$ in two's complement representation, then an intermediate sum word $s_1$, $s_O=0$, 1 corresponding to the value $+1$ is produced, with a carry word $c_2$, $c_1=1$, 0 corresponding to the value $-4$. Since, however, $c_2$ is to be neglected in the addition in order not to have to provide a further adder $AS_n$ especially for this, we are here confronted with an overflow effect which, upon omission of $c_2$, leads to a carry word $c_1=0$, and thus comprises the partial sums $+1$ (from the intermediate sum word) and 0 (from the carry word), leading to a (faulty) result $+1$. If, however, the carry word $c_2$, $c_1$ were allowed, then the partial sum therefrom would be −4, this yielding a (correct) result of −3.

In a second numerical example with n=2, let A=1, B=1 and D=−1 apply. In two's complement, this corresponds to the numbers A=01, B=01 and D=11. The addition then leads to the partial sums $s_1$, $s_0$=1, 1 corresponding to the value −1 and $c_1$=1 having the value −2, i.e., it leads to the incorrect result of −3. Only when $c_2$=0 is again taken into consideration does a partial sum $c_2$, $c_1$ of 0, 1 having the value of +2 result, and, together with $s_1$, $s_0$, the correct result of +1. When, however, $c_2$ is omitted, then an overflow effect is also present here.

In accord with the invention, the most significant adder $AD_{n-1}$ is followed by a correction element 1 which comprises three inputs 2 through 4. Of these, the input 2 receives $c_n$, the input 3 receives $s_{n-1}$ and the input 4 receives $c_{n-1}$. One output 5 of the correction element 1 is connected to the input 21 of AS and a second output 6 is connected to the input 11 of AS. In the correction element, $c_n$ and $c_{n-1}$ are compared to one another. When $c_n \neq c_{n-1}$, then the carry bit on present at 2 is connected through to the output 6 instead of $s_{n-1}$ and is thus applied to the input 11. The sum bit at the output 6 which has been corrected to this degree is referenced $s_{(n-1)k}$. The output 5 is always wired with $c_n$, this being indicated in FIG. 1 with a broken-line connection between 2 and 5. Thus, $c_n$ is always connected through to the input 21 of $AS_{n-1}$. What is successfully accomplished by means of this measure is that the intermediate sum words and carry words arising at the outputs of the adders $AD_i$ are corrected such that the correct result is formed even without using a further adder $AS_n$ in AS.

In the case of the first numerical example, the correction element executes the following corrections: $c_1$ is replaced by $c_2$=1, so that, taking the place value of $c_1$ into consideration, the corrected partial sum −2 is produced. Further, $s_{1k}$=1 applies, so that the sum word $s_{lk}$, $s_0$ becomes 1, 1 and, thus, yields a corrected partial sum of −1. At the outputs 31, 32 . . . , the two corrected partial sums yield a sum word that corresponds to the desired addition result of −3.

In the second numerical example, the following correction measures are produced by use of the correction element 1: $c_1$ is replaced by $C_2$=0, so that the correct partial sum 0 derives. Further, $s_{1k}$=0 applies, so that the sum word $s_{1k}$, $s_0$ becomes 0, 1 and, thus, corresponds to a corrected partial sum of +1. At the outputs 31, 32 . . , the two corrected partial sums then yield a sum word that corresponds to the corrected addition result of +1.

The correction measures undertaken by the correction element 1 can also be applied in an addition of three or more place binary numbers A, B and D since, of course, the carry bit $c_{n-2}$ (which is no longer to be neglected in this case) did not have to be involved in the said correction measures.

The carry bits and intermediate sum bits of the adders $AD_i$ can be intermediately stored by intermediate memories 7, 9, 14 . . . and 8, 10 . . . which precede the inputs 11, 12, . . . and 21, 22 . . . and can be transmitted in common to the adders $AS_i$ at the time of a clock pulse. Such an arrangement can be expanded in such fashion that the outputs of the registers 7, 9, 14 . . . and 8, 10 . . . are supplied to the first and second inputs of a group or line of second adders $AD_i'$, whereby the outputs of registers 7', 9' . . . and 8', 10' . . . following the latter are connected to the inputs 11, 12 . . . and 21, 22 . . . of AS. On the other hand, the line of second adders can be followed by identically constructed lines of third and fourth adders comprising respectively following intermediate memories, whereby the intermediate memory output of the last of these adder lines are wired to the indicated inputs of the adder device AS. The intermediate memories are clocked such that the intermediate sum and carry words of a line under consideration are respectively transmitted in common to the next line, whereby the line under consideration receives the intermediate sum words and carry words of the preceding line that belong to different addition operation, in synchronism with the same clock pulse.

This system of step-by-step forwarding of the addition results from line to line and of simultaneous processing of various additional operands in the individual lines respectively separated from one another by intermediate memories is referred to as "pipelining" in the literature. See "IEEE Transactions on Computers", Vol. C-27, No. 9, Sept. 1978, pp. 855–865. In every adder line $AD_i$, $AD_i'$, etc., the most significant adder $AD_{n-1}$, $AD_{n-1}'$, etc., is respectively followed by a correction element, in accord with the invention, in order to avoid addition errors as a consequence of overflow effects.

FIG. 2 shows the application of the invention of a group or line of first adders $AD_i$ which serve for the bit-parallel addition of three binary numbers in a recursive circuit design. The circuit parts already set forth with reference to FIG. 1 are provided with the same reference characters here. The adder means AS having the outputs 31, 32 . . . again follows the circuit points 11, 12 . . . and 21, 22 . . . . The first inputs of $AD_i$ are respectively wired to the outputs of the intermediate memories 7, 9, 14 . . . which follow the sum outputs of these adders. In detail, the first input of $AD_{n-1}$ is wired to the output of the intermediate memory 7, the first input of $AD_{n-2}$ is wired to the output of 9, the first input $AD_{n-3}$ is wired to the output of 14, etc. The second inputs of $AD_i$ are respectively wired to the outputs of those intermediate memories 8, 10 which serve for the intermediate storage of the carry bits formed in the adders of the next-lower significance. Thus, for example, the second input of $AD_{n-2}$ is wired to the output of 10. In accord with FIG. 1, the third inputs of the adders $AD_i$ receive the bits $d_{n-2}$, $d_{n-3}$ . . . $d_0$ of a binary number D.

When, in a series of successive clock periods, a sequence of binary numbers Di which, for example, correspond to respectively allocated amplitude value of an analog signal, are made available and when the intermediate memories 7, 9, 14 . . . and 8, 10 . . . are operated in the same clock time, then the intermediate sum bits $s_{(n-1)k}$, $s_{n-2}$, $s_{n-3}$ derived from the first number D are available in the registers 7, 9, 14, etc., at the end of the first clock period. At the beginning of the second clock period, these are then supplied to the first inputs of $AD_i$, whereas the next binary number D within the sequence is supplied to the third inputs of $AD_i$. At the beginning of the third and all further clock periods, the carry bits of the outputs of the intermediate memories 8, 10 etc., are then supplied to the second inputs of $AD_i$, the intermediate sum bits of the outputs of the intermediate memories 7, 9, 14, etc., are supplied to the first inputs of $AD_i$ and a respective further binary number D is supplied to the third inputs. A continuing addition of the successive binary numbers Di thus take place. Such a recursive arrangement is referred to as an accumulator. A digital filter circuit wherein an accumulator is employed is described in Proceedings of the IEEE, Vol.

63, No. 4, April 1975, pp. 633-648, cf., in particular, FIGS. 16 and 17 and the appertaining text.

The correction element 1 set forth with reference to FIG. 1 is also utilized in the recursive circuit of FIG. 2. In accord with FIG. 1, the input of the intermediate memory 8 is connected to the output 5 of 1, the output of 8 is wired to the input 21 and to the second input of $AD_{n-1}$. The corrected intermediate sum words and carry words can be taken at the circuit points 11, 12 . . . and 21, 22 . . . .

FIG. 3 shows a development of the arrangement of FIG. 2 which serves for the bit-parallel addition of four binary numbers in two's complement. The adders $AD_i$ (already shown in FIG. 2) are here respectively followed by additional adders $ZA_i$ provided with three inputs. The outputs of the adders $AD_i$ are wired in the way already set forth with reference to FIG. 2, but with the difference that the intermediate memories 7, 9, 14 . . . and 8, 10 . . . are omitted, that the recursive connections proceeding in FIG. 2 from the outputs of the adders $AD_i$ to the respective inputs thereof are likewise omitted, and that the circuit points 11, 12 . . . and 21, 22 arranged under the adders $AD_i$ in FIG. 2 are now arranged between the lines of the adders $AD_i$ and the additional adders $ZA_i$. These circuit points, the signals appearing at them and the correction element 1 are therefore provided with the same reference characters as in FIG. 2 but with the addition of a "Z" or "z". The circuit points Z11 and Z21 are wired to the first two inputs of $ZA_{n-1}$, the circuit points Z12 and Z22 are wired to the first two inputs of $ZA_{n-2}$, and the circuit point Z13 is wired to the first input of $ZA_{n-3}$, etc.

At their outputs, the additional adders $ZA_i$ are wired in the same way and to the same circuit parts as the adders $AD_i$ in FIG. 2. The recursive connections are conducted from the outputs of $ZA_i$ to the inputs of the adders $AD_i$. In detail, the circuit point 11 is connected to the first input and the circuit point 21 is connected to the second input of $AD_{n-1}$, the points 12 and 22 are connected to the first two inputs of $AD_{n-2}$, the point 13 is connected to the first input of $AD_{n-3}$, etc.

In FIG. 3, the intermediate sum word appearing at the points 11, 12, 13 . . . represents a first binary number, the carry words appearing at the points 21, 22 . . . represents a second binary number, the number D adjacent to the third inputs of $AD_i$ in accord with FIG. 2 represents a third binary number and a number E applied to the third inputs $DE_i$ of the additional adders $ZA_i$ represents a fourth binary number, that are to be respectively added to one another in bit-parallel. The intermediate sum words and carry words again appear at the circuit points 11, 12 . . . and 21, 22 . . . , the desired sum word being formed from these intermediate sum words and carry words in an adder means AS. The bits $zs_{n-1}$ and $sc_{n-1}$ taken at the outputs of $AD_{n-1}$ and $AD_{n-2}$ are corrected by the correction element Z1 in the way set forth with reference to FIG. 1 and the bits $s_{n-1}$ and $c_{n-1}$ appearing at the outputs of $ZA_{n-1}$ and $ZA_{n-2}$ are corrected by the correction element 1.

By adding further adders following the adders $ZA_i$, the arrangement of FIG. 3 can be expanded in the corresponding fashion for an addition of five or more binary numbers in two's complement. Within each such adder line, a correction of the output bits from the two most significant adders is undertaken in accord with the invention in the way set forth, i.e. by means of the correction elements Z1, 1 and correspondingly fashioned, further correction elements. Circuit arrangements formed from a plurality of adder lines for the addition of five or more binary number are described in the book *Computer Arithmetic* by K. Hwang, John Wiley and Sons, New York 1979, pp. 100-103, cf., in particular, FIG. 4.3. Transistors T27 through T30 likewise lies between the terminals 18 and 19.

T27 and T28 are p-channel transistors, and T29 and T30 are n-channel transistors. The junction of the two inwardly situated transistors T28 and T29 of this series circuit is connected to the output AGS', whereby the gates of T28 and T29 are driven via the output 20 of the inverter T25, T26. The gate of T27 and T30 can be driven with the supplied, inverted carry bit $\bar{c}_{n-1}$. In case of the overflow condition $c_n \neq c_{n-1}$, one of the transistors T17 or T17a and one the transistors T18 and T18a inhibits, so that the output AGS' is disconnected both from P2 as well as from P3. On the other hand, the transistor T27 is switched conductive by $\bar{c}_{n-1}=0$, this leading to the activation of T28 during the existence of the overflow condition with the 0 that is then produced at the output of the inverter T25, T26. A 1 is thus transmitted to the output AGS'. Given $\bar{c}_{n-1}=1$, T20 is conductive during the overflow condition, and 1 is then produced at the output 20, leading to the activation of T29, so that a 0 can be taken at AGS'.

Figure 4:
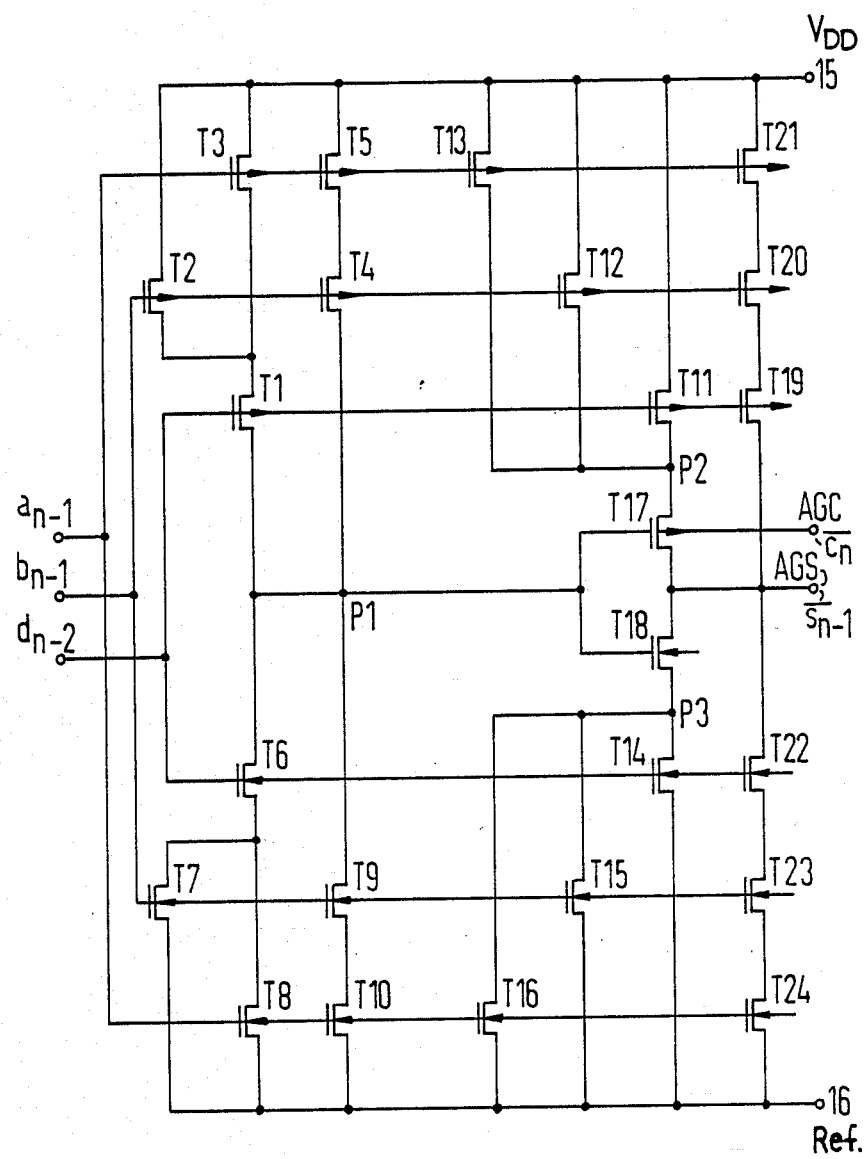
FIG. 4 is a schematic diagram of a sub-circuit from FIGS. 1 through 3.
Figure 7:
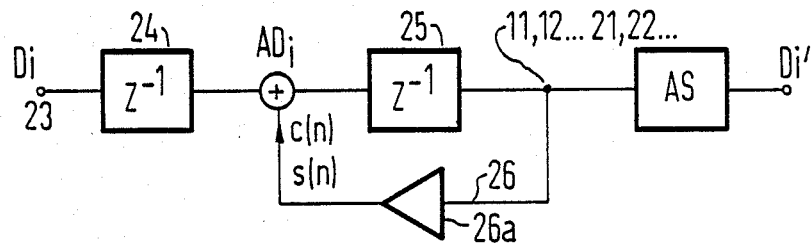
FIG. 7 is a functional block diagram of an applied example for the arrangement of FIG. 2.

FIG. 7 shows a recursive filter of the first order which contains an accumulator like that of FIG. 2. A sequence of n-place binary numbers Di represented in two's complement and corresponding to a sequence of sampled amplitude values of an analog input signal is applied to the input 2S in successive clock periods. The sequence is first delayed bit-parallel by one clock period duration in a delay stage 24, which is composed of n intermediate memories, and are then respectively supplied to the third inputs of the accumulator $AD_i$. The intermediate sum words and carry words respectively derived therefrom are delayed by a further clock period duration in a delay stage 25 which is composed of the intermediate memories 7, 9, 14 . . . and 8, 10 . . . and are then supplied to the first and second inputs of the accumulator via a recursive loop 26. Both words can be shifted FIG. 4 shows an exemplary circuit of the adder $AD_{n-1}$ executed in CMOS technology which corresponds to the adders $AD_i$ and $ZA_i$ in terms of structure and function. A circuit point P1 is connected to the terminal 15 via three two-element transistor series circuits, this terminal 15 being wired with a supply voltage $V_{DD}$. The first transistor series circuit is composed of the p-channel switching transistors T1 and T2, the second is composed of the p-channel switching transistors T1 and T3 and the third is composed of the p-channel switching transistors T4 and T5. The gate of T1 is controllable via the third input of $AD_{n-1}$ which receives $d_{n-2}$, the gates of T2 and T4 are controllable via the second input which receives $b_{n-1}$, and the gates of T3 and T5 are controllable via the first input which receives $a_{n-1}$. On the other hand, P1 is connected to a terminal 16 via three two-element transistor series circuits, this terminal 16 being wired to reference potential. These series circuits T6 and T7, T6 and T8 as well as T9 and T10, are respectively constructed of n-channel field effect transistors. The gate of T6 is driven with $d_{n-2}$, the gates of T7 and T9 are driven with $b_{n-1}$, and the gates of T8 and T10 are driven with $a_{n-1}$. The circuit point P1 corresponds to a carry output AGC of $AD_{n-1}$ at which the inverted carry signal $\bar{c}_n$ can be taken.

Another circuit point P2 is connected to the respective terminal 15 via three p-channel switching transistors T11 and T13 and a third circuit point P3 is connected to the terminal 16 via three n-channel switching transistors T14 through T16. T11 and T14 are thereby respectively controllable via $d_{n-2}$, T12 and T15 are respectively controllable via $b_{n-1}$, and T13 and T16 are respectively controllable via $a_{n-1}$. The circuit points P2 and P3 are connected to one another via the series connection of a p-channel switching transistor T17 and an n-channel switching transistor T18, whereby the gates of T17 and T18 are connected to P1, whereas the junction of T17 and T18 represents an output AGS of $AD_{n-1}$ at which the inverted sum bit $\overline{s}_{n-1}$ appears. This latter output is additionally connected to 15 via a three-element series circuit of p-channel switching transistors T19 through T21 and is connected to the circuit point 16 via a three-element series circuit of n-channel switching transistors T22 through T24. The gates of T19 and T22 are drivable with $D_{n-2}$, the gates of T20 and T23 with $b_{n-1}$ and the gates of T21 and T24 with $a_{n-1}$.

FIG. 5 shows a function table for the sub-circuit composed of the adder $AD_{n-1}$ and of the following correction element 1. Each line lists the bits $a_{n-1}$, $b_{n-1}$, $d_{n-1}$ and $c_{n-1}$ supplied to the four inputs of this sub-circuit, with the last bit in inverted form $\overline{c_{n-1}}$, and the last two columns then list the bits $c_n$ and $s_{(n-1)k}$ appearing at the outputs 5 and 6 respectively dependent thereon, in inverted form as $\overline{c}_n$ and $\overline{s}_{(n-1)k}$.

Figure 6:
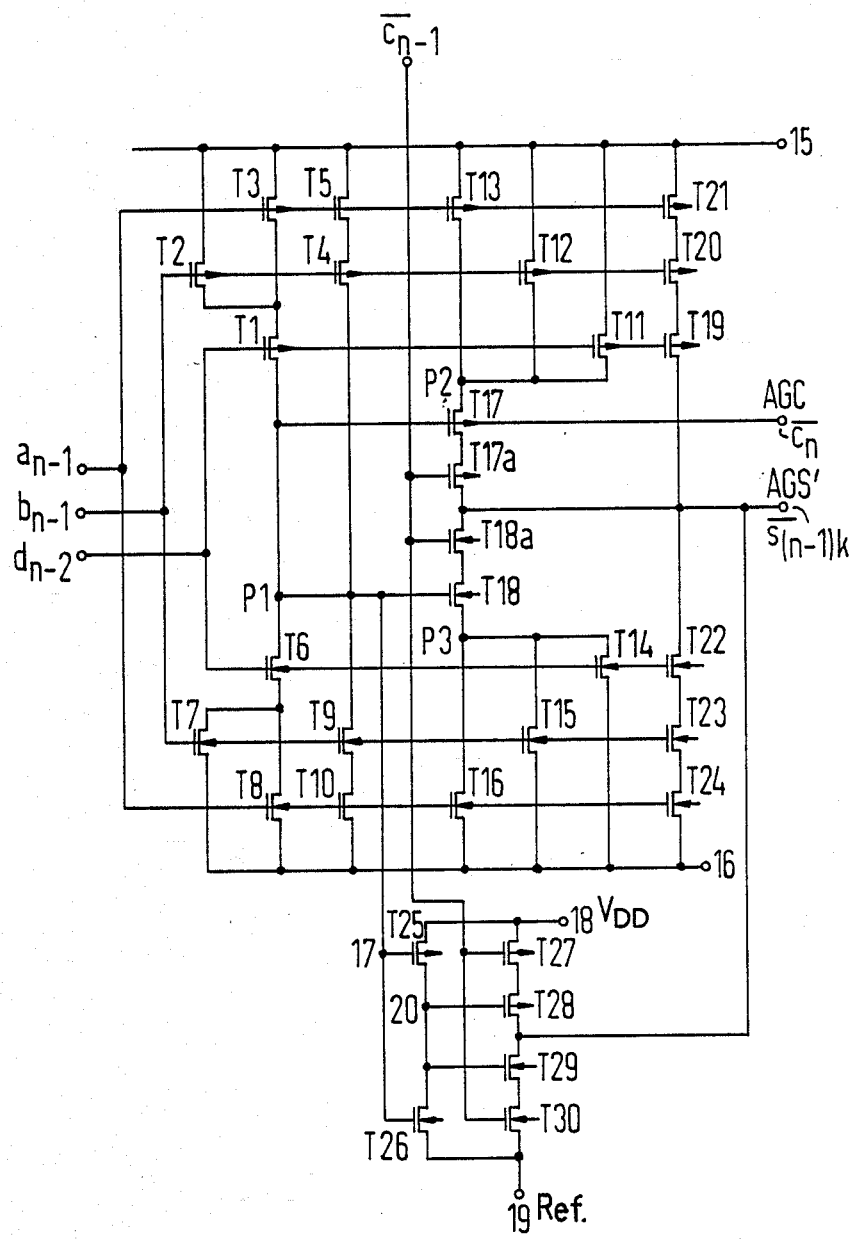
FIG. 6 is a schematic diagram of a CMOS realization of the sub-circuit described by the function table in FIG. 5.

FIG. 6 shows an exemplary circuit of the sub-circuit comprising $AD_{n-1}$ and the correction element 1 executed in CMOS technology which fulfills the function table of FIG. 5. This sub-circuit proceeds from the circuit of FIG. 3 on the basis of slight modifications or expansions. To this end, first, the transistors T17 and T18 of FIG. 3 are separated from one another and are then reconnected to one another by the series circuit of a p-channel switching transistor T17a and an n-channel switching transistor T18a whose gates are drivable with the inverted carry bit $\overline{c_{n-1}}$. Here, the junction of T17a and T18a represents an output ADS' at which the inverted, corrected sum bit $\overline{s}_{(n-1)k}$ can be taken. T17a lies between ADS' and T17, whereas T18a is arranged between AGS' and T18. P1 is connected to the input of an inverter which is composed of the series circuit of a p-channel switching transistor T25 and an n-channel switching transistor T26. This series circuit lies between a terminal 18 that is wired with $V_{DD}$ and a terminal 19 that lies at reference potential. A four-element series circuit of switching by m bits toward the right or left in their allocation to the individual adders $AD_i$, this corresponding to a multiplication by $2^{-m}$ or, respectively, $2^m$ in an evaluator 26a. The words supplied via 26 are added to the binary number D respectively supplied to the third inputs of $AD_i$ with the next-following clock pulse. The intermediate sum words and carry words appearing at the output of the delay stage 25 are supplied to the adder means AS via its inputs 11, 12 ... 21, 22, and are combined to form the filtered, digital output signal $Di'$.

Figure 8:
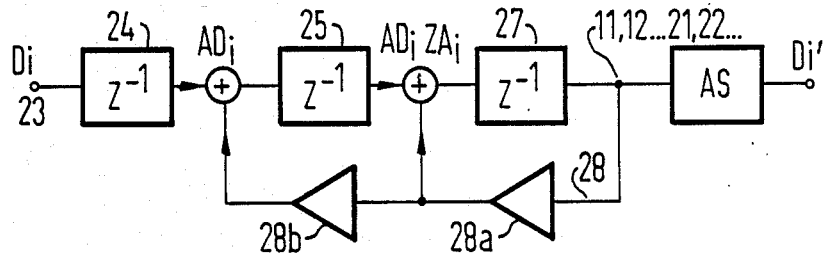
FIG. 8 is a functional block diagram of an applied example for the arrangement of FIG. 3.

FIG. 8 shows a recursive filter of the second order which differs from that of FIG. 7 in that the intermediate sum words and carry words produced at the output of the stage 25 are supplied to an accumulator like that of FIG. 3, indicated with $AD_i$, $ZA_i$. The intermediate sum words and carry words produced as output by the latter are delayed by one clock period duration in a delay stage 27 (which corresponds to the registers 7, 9, 14 ... and 8, 10 ... of FIG. 3) and are supplied via a recursive loop 28 to both the first two inputs of the accumulator $AD_i$ as well as the first two inputs of the accumulator $AD_i$, $ZA_i$.

Both words can again be shifted by m bits toward the right or left in their allocation to the individual adders $AD_i$ of the accumulator of FIG. 3, this corresponding to a multiplication by $2^{-m1}$ or, respectively $2^{m1}$ in an evaluator 28a. The words evaluated in this fashion can then be further shifted by m2 bits toward the right or left in their allocation to the individual adders $AD_i$ of the accumulator of FIG. 2, this corresponding to further multiplication by $2^{-m2}$ or, respectively, $2^{m2}$ in an evaluator 28b.

The third input of $AD_i$ receives $D_i$; the third and fourth input of $AD_i$, $ZA_i$ receives the intermediate sum words and carry words of the first accumulator $AD_i$ output via stage 25. The intermediate sum words and carry words appearing at the output of the delay stage 27 are supplied to the adder means AS via its inputs 11, 12 ... 21, 22 ... and are combined to form the filtered, digital output signal $Di'$.

An accumulator like that of FIG. 2 and n-1 accumulators like those of FIG. 3 can be utilized in an analogous fashion in a recursive filter of the $n^{th}$ order.

Figure 9:
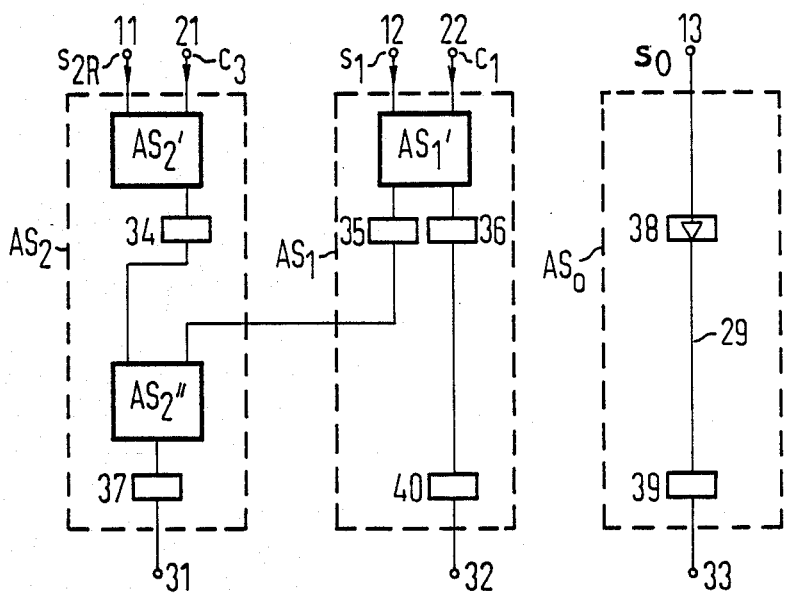
FIG. 9 is a functional block diagram of an exemplary circuit for a further sub-circuit of FIG. 1.

FIG. 9 shows an exemplary circuit using the adder means AS for three-place binary numbers (n=3. Here, the adder $AS_2$ comprises two half-adders $AS_2'$ and $AS_2''$ and the adder $AS_1$ comprises a half-adder $AS_140$. The inputs 11 and 21 (FIG. 1) represent the inputs of $AS_2'$ and the inputs 12 and 22 represent the inputs of $AS_1'$. The "adder" of the lowest significance $AS_O$ to which only one sum bit $s_0$ is supplied via the input 13, but to which no carry bit is supplied, is simplified to a line 29 connected from input 13 to the output 33. The half-adder $AS_1'$ to which the sum bit $s_1$ and the carry bit $c_1$ are supplied via the inputs 12 and 22 supplies a sum bit to the output 32 and a carry bit to one input of the half-adder $AS_2''$ whose other input is connected to the sum bit output from $AS_2'$. $AS_2''$ then supplies a sum bit to the output 31. The output of the half-adders $AS_2'$ and $AS_1'$ are followed by intermediate memories 34 through 36 and the output of $AS_2''$ is followed by an intermediate memory 37. What is achieved by inserting further intermediate memories 38, 39 and 40 into the line 28 and between the output of the register 36 and the output 32 is that the sum bits forming the result arrive simultaneously at the outputs 31 through 33.

The intermediate memories 34 through 40 are operated in the same clock time as the intermediate memories 7, 9, 14 ... and 8, 10 ..., etc. As a consequence of the relatively short processing times applying for the half-adders $AS_i'$, $AS_i''$, expedient to combine two respective adder lines of AS into a double line, whereby each such double line is followed by a line of intermediate memories. In FIG. 9, this would mean that the intermediate memories 34 through 36 and 38 are eliminated. An expansion of the 3-bit adder device AS of FIG. 9 to four or more place binary numbers is undertaken in such fashion that the lines of the half-adders are respectively expanded toward the left by a half-adder for every added place, whereby the number of lines is respectively increased by one at the same time. An adder stage for the addition of four-place sum words and carry words is described in IEEE Transactions of Computers, Vol C-27, No. 9, Sept. 1978, pp. 863-864, particularly FIG. 7b.

All intermediate memories 7, 9, 14 ... and 8, 10 ... as well as 34 ... 40 are expediently designed as shift register stages in the form of master-slave flipflops.

In a departure from the exemplary embodiments of FIGS. 1 through 3, in addition to the two most significant adders, for example $AD_{n-1}$ and $AD_{n-d}$, of every group, further adders of contiguous significance, for example $AD_{n-3}$ and $AD_{n-4}$, can also be occupied with one and the same bit of a supplied binary number D or, respectively, E, supplied via their third inputs. This then corresponds to an operational sign multiplication of the binary numbers represented in two's complement.

It will be appreciated by those skilled in the art that various additions and modifications may be made in the invention without departing from the essential features of novelty thereof, which are intended to be defined and secured by the appended claims.

What is claimed is:

1. In an arrangement for bit-parallel addition of binary numbers in two's complement, having a group of first adders ($AD_i$) which respectively receive inputs for binary number bits of equivalent significance and produce intermediate sum and carry bits, and an adder means (AS) for the formation of a sum word from said intermediate sum and carry bits, said arrangement comprising, in combination ; means for replacing the carry bit ($c_{n-1}$) of the first adder ($AD_{n-1}$) having the second highest significance with the carry bit (cn) of the most significant first adder ($AD_{n-1}$); and a first correction element connected to receive the sum output of said most significant first adder and for replacing the intermediate sum bit ($s_{n-1}$) of this adder with the carry bit ($c_n$) of said most significant first adder ($AD_{n-1}$) when the carry bits ($c_n$, $c_{n-1}$) of the two most significant first adders ($AD_{n-1}$, $AD_{n-2}$) are unequal.

2. Apparatus according to claim 1 including a plurality of first intermediate memories connected to receive said intermediate sum bits and carry bits from said first adders ($AD_i$) and from said first correction element, and having outputs connected to said adder means (AS).

3. Apparatus according to claim 2 including means for connecting a first set of inputs of said first adders ($AD_i$) respectively to the outputs of said first intermediate memories, and means for selecting connecting a second set of inputs of said first adders ($AD_i$) respectively to outputs of said first intermediate memories of said first adders of the next-lower significance, or alternatively for connecting said second set of inputs to outputs of said first intermediate memories which are shifted by a constant number of orders, means for loading said intermediate memories in synchronism with clock pulses at a prescribed clock frequency, and means for presenting to a third set of inputs of said first adders ($AD_i$) a sequence of binary numbers ($D_i$) coincident with said clock pulses.

4. Apparatus according to claim 2 including means for selectively connecting a first set of inputs of said first adders ($AD_i$) from the outputs of said intermediate memories of the same significance and means for connecting a second set of inputs of said first adders ($AD_i$) respectively from said intermediate memories for receiving said carry bits of the next-lower significance of said further group, or alternatively for connecting said first and second sets of inputs to outputs of said intermediate memories which are shifted by a constant number of orders, means for loading said intermediate memories in synchronism with clock pulses at a prescribed clock frequency, and means for providing inputs to said first adders ($AD_i$) and clock pulses.

5. Apparatus according to claim 4, wherein said correction element incorporates a first circuit point (P1) connected to a first terminal by way of three two-element series circuits of field effect transistors having a first channel type, said first terminal being connected with a supply voltage, means for connected said first circuit point to a second terminal by way of three two-element series circuits of field effect transistors of a second channel type, said second terminal being connected to a reference potential, a second circuit point (P2), means for connecting said second circuit point to said first terminal by way of three field effect transistors of said first channel type, a third circuit point, means for connecting said third circuit point to said second terminal by way of three field effect transistors of said second channel type, means for connecting said second circuit point (P2) to the inverse sum output (AGS') of said correction element by way of a series circuit of two field effect transistors of said first channel type, means for connecting said third circuit point (P3) to said inverse sum output (AGS') by way of a series circuit of two field effect transistors of said second channel type, means for connecting the gates of the transistors of said two-element series circuits to three inputs of said first adder such that signals applied to two of said three inputs switch one of said series circuits of transistors of said first channel type into conduction, and inverse signals at the said inputs switch one of said three two element series circuits of transistors of said second channel type into conduction, means for connecting the gates of said three field effect transistors of said first channel type that lie between said second circuit point (P2) and said first terminal to one of the inputs of said first adder, means for connecting the gates of said three field effect transistors of said second channel type which are arranged between said third circuit point (P3) and said second terminal to one of the inputs of said first adder, means for connecting said first circuit point (P1) to the inverse carry output (AGC) of said adder, means responsive to a signal at said first circuit point (P1) for driving the gates of one of the transistors of said series circuits between said second circuit point (P2) and said inverse sum output (AGS') and between said third circuit point (P3) and the inverse sum output, means for connecting the gates of the other two transistors of said series circuits between said second circuit point and said inverse sum output and between said third circuit point and said inverse sum output to the inverse carry output of the first adder having the next-lower significance, means for connecting the inverse sum output (AGS') to said first terminal by way of a three element series circuit of field effect transistors of said first channel type and to said second terminal by way of a three element series circuit of field effect transistors of said second channel type, means for controlling the field effect transistors of each of the AGS' connected circuits by inputs of said adder, means for connecting said inverse sum output (AGS') to a supply voltage through two switching transistors of said first channel type and to a reference potential through two switching transistors of said second channel type, means for connecting the gates of one of the last named switching transistors of said second channel type to the inverse carry output of the adder of the next-lower significance, and means for connecting the gates of the two remaining switching transistors of the last named switching transistors to an output of an inverter having its input connected to said first circuit point.

6. Apparatus according to claim 4, including a recursive loop whereby said first adders ($AD_i$) and the adders ($ZA_i$) of said further group of adders serve for the addition of sum words and carry words supplied to first and second inputs of said first adders by way of said recursive loop, and a first accumulator connected to receive the outputs of said first adders ($AD_i$) whereby said intermediate memories form a delay stage and said adder means (AS) serves for the formation of the digitized amplitude values of filtered input signal (Di').

7. Apparatus according to claim 2 wherein said first adder ($AD_i$) *serves for the addition of intermediate sum words and carry words supplied by way of a recursive loop to sampled, digitized amplitude values of an input signal (Di) supplied by way of the third input of said first adders ($AD_i$)*, said first intermediate memories forming a delay stage, wherein said adder means (AS) serves for the formation of the digitized amplitude values of filtered input signal (Di').

8. Apparatus according to claim 1, wherein said first adder means (AS) contains first and second groups of half-adders ($AS_2'$, $AS_1'$) means for connecting the first inputs of said half-adders of said first group to the intermediate sum bits means for connecting the second inputs of said half-adders of said first group with carry bits, whereby one sum bit output from a half-adder ($AS_2'$) of said first group together with a carry bit output from a half-adder ($AS_1'$) of the next-lowest significance of said first group are supplied as inputs to said half-adder ($AS_2''$) of said second group of half adders, whereby the carry bits of the respectively most significant half-adders of the individual groups are left unconnected, and means for forming sum bits from sum outputs of half-adders ($AS_1'$, $AS_2''$) to which carry bits of the next-lower significance are not connected.

9. Apparatus according to claim 1, wherein said intermediate memories comprise shift register stages, formed of master-slave flipflops.

* * * * *